J. WILLIAMS.
Carriers for Excavators.

No. 139,446. Patented May 27, 1873.

Witnesses.
John Grist Sr.
John Grist Junr.

Inventor
Joseph Williams
by his attorney
Henry Grist.

AM. PHOTO-LITHOGRAPHIC CO. N.Y. (OSBORNE'S PROCESS.)

UNITED STATES PATENT OFFICE.

JOSEPH WILLIAMS, OF HEMMINGFORD, CANADA.

IMPROVEMENT IN CARRIERS FOR EXCAVATORS.

Specification forming part of Letters Patent No. 139,446, dated May 27, 1873; application filed February 3, 1873.

*To all whom it may concern:*

Be it known that I, JOSEPH WILLIAMS, of the village of Hemmingford, in the county of Huntingdon, in the Province of Quebec, in the Dominion of Canada, have invented certain Improvements in Excavating-Machines, of which the following is a specification:

The invention relates to the construction of a machine for excavating, to be operated by animals, steam, or other motive power, applied to a horizontal shaft carrying a polygonal drum, to rotate an endless apron composed of sections or leaves hinged together by pintles, for securing thereto the scoops or or shovels. To the ends of the pintles are journaled wheels which run over an endless track of any suitable extent secured to or inserted in the ends of the frame of the machine. Both edges of the apron are provided with lapping side pieces to retain the earth, &c., on the apron, and prevent it from incommoding the wheels.

Figure 1:
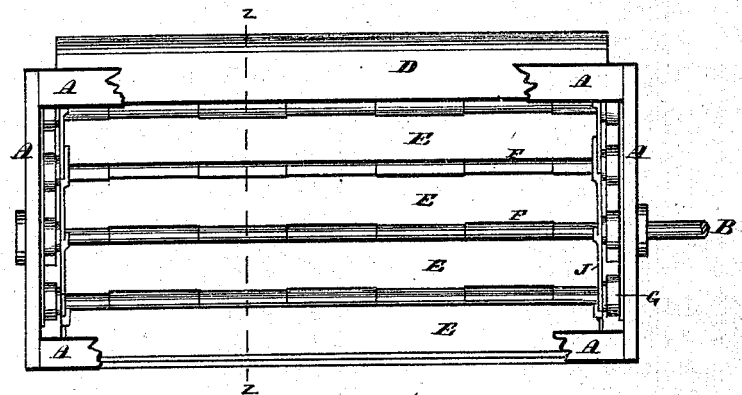
Figure 2:
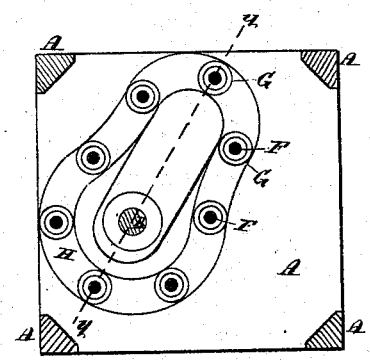
Figure 3:
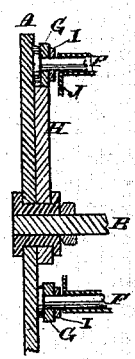
Figure 4:
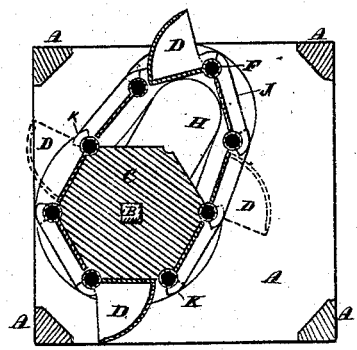

Figure 1 is a front elevation of a machine embodying my invention. Fig. 2 is a transverse vertical section of the same with the buckets and apron removed. Fig. 3 is a like section of the same on the line $y\,y$ of Fig. 2. Fig. 4 is a vertical section on the line $z\,z$ of Fig. 1.

A is the rectangular frame of the machine. B is a horizontal shaft having its bearings in the ends of the frame, and to which the motive power for operating the machine is applied in any suitable manner. This shaft carries a polygonal drum, C, for operating the endless apron, which is composed of a series of leaves, E, hinged together by pintles or rods F. The sides of the drum correspond to the width of the leaves, so that when the drum is rotated it revolves the apron. D are excavating scoops or shovels secured to the leaves E at or near the joints, and extend the whole breadth of the apron. G are loose wheels on the ends of the pintles to run over an endless track, H, secured to the ends of the frame A or inserted flush therewith, and which track may be of elliptical or other suitable course. I are friction-washers on the pintles inside of the wheels G. J are side pieces secured to the leaves E, and K are quadrant-shaped pieces lapping over the pieces J, and co-acting with them to prevent the earth from falling on the track and to retain it on the apron.

A scoop or shovel, D, may be secured to each leaf, if required, or to alternate leaves, or a less number of scoops may be employed, if desired, according to the nature of the ground or substance to be excavated.

The scoops, by the rotary motion of the endless apron, gather the earth when at their lowest point, and deposit it into a cart or other receptacle placed below when reaching their highest point, or the earth may be deposited from the scoop on an elevator of any suitable construction, attached to and operated by the machine in any suitable manner.

I claim as my invention—

In excavating-machines, the construction of the endless apron of leaves E having close-fitting knuckle-joints united by pintles or rods F, and provided with overlapping end pieces composed of side pieces J and quadrant-shaped pieces K, as and for the purposes set forth.

JOSEPH WILLIAMS.

Witnesses:
HENRY GRIST,
WALTER ALLEN.